March 16, 1926. 1,576,958
F. E. FICK
BRAKE OPERATING LINKAGE
Filed Feb. 27, 1925 2 Sheets-Sheet 2
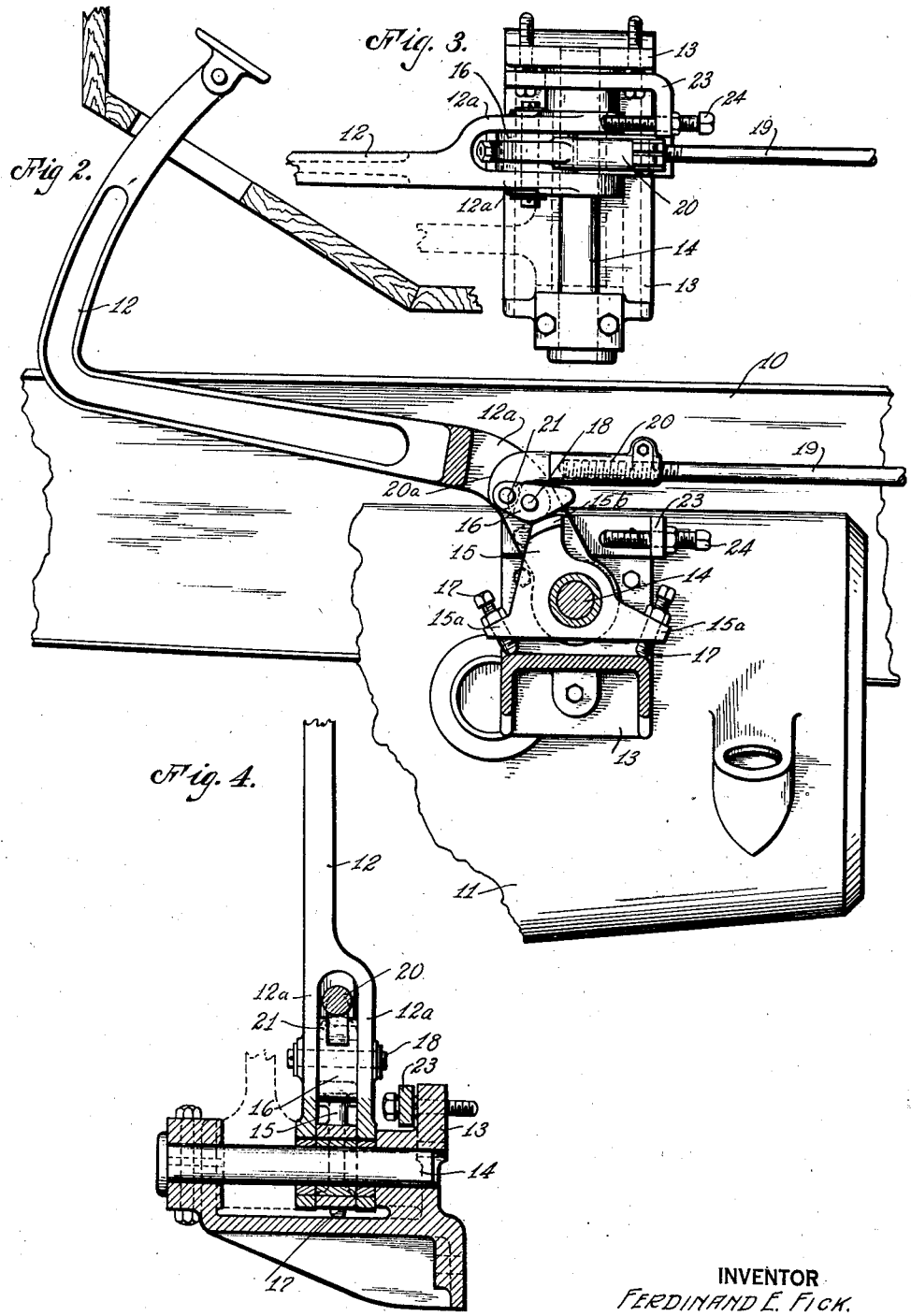
INVENTOR
FERDINAND E. FICK.
BY
A. H. Edgerton
ATTORNEY Patented Mar. 16, 1926.

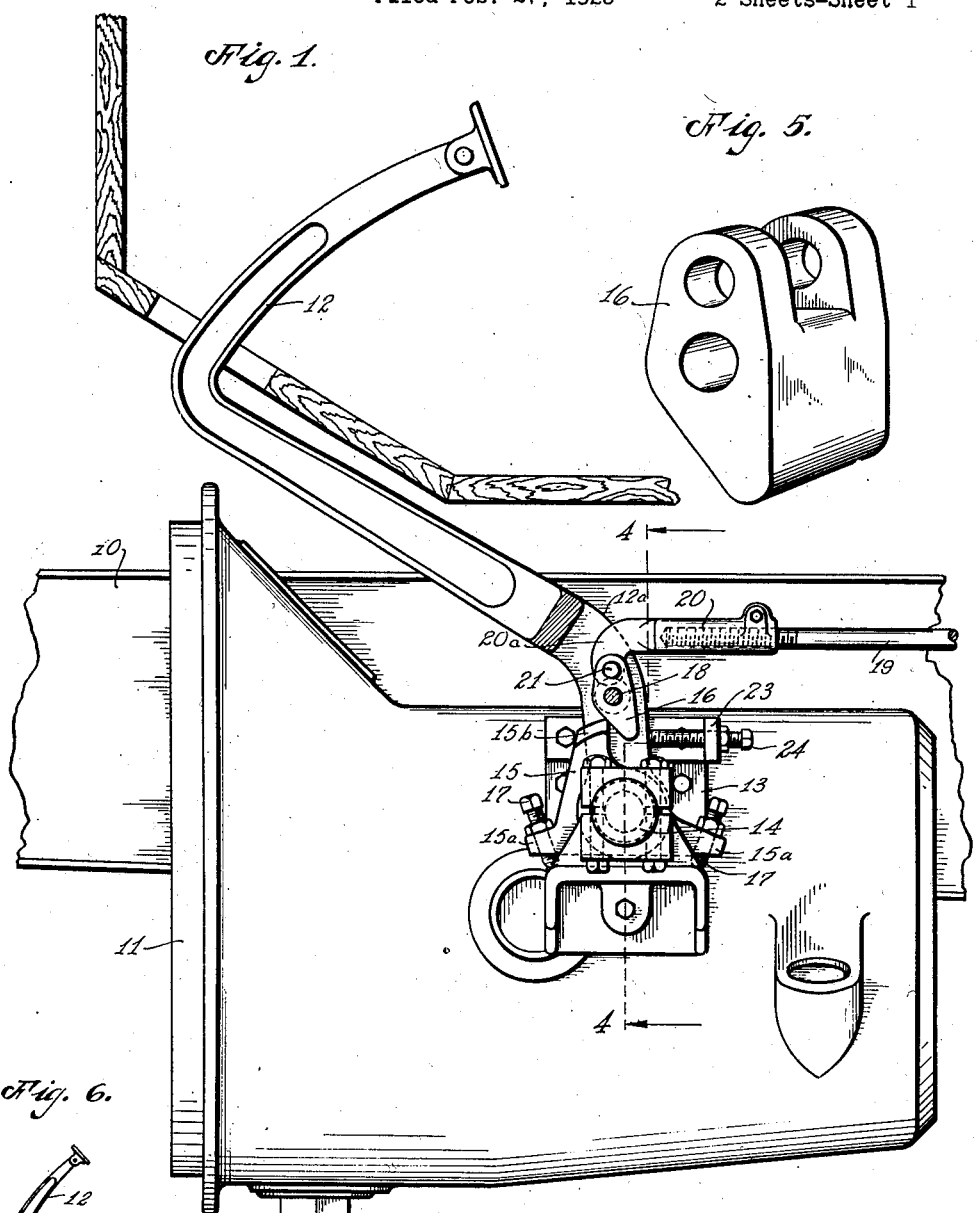

1,576,958

UNITED STATES PATENT OFFICE.

FERDINAND E. FICK, OF SOUTH EUCLID, OHIO, ASSIGNOR TO THE WHITE COMPANY, OF CLEVELAND, OHIO, A CORPORATION OF OHIO.

BRAKE-OPERATING LINKAGE.

Application filed February 27, 1925. Serial No. 12,029.

*To all whom it may concern:*

Be it known that I, FERDINAND E. FICK, a citizen of the United States, residing at 2416 Mayfield Road, South Euclid, Ohio, county of Cuyahoga, and State of Ohio, have invented new and useful Improvements in Brake-Operating Linkage, of which the following is a specification, reference being had to the accompanying drawings, and to the letters and figures of reference marked thereon.

This invention relates to improvements in brake operating linkage and is particularly applicable to motor vehicle brakes.

An object of the invention is to provide a varying leverage in the brake control linkage to take up the slack therein, in the early part of the travel of the brake lever or pedal.

Another object of this invention is to provide a brake linkage which will be simple in construction and readily applicable to the other standard parts of motor vehicles.

Another object of the invention is to provide a mechanism which is simple of construction, positive in action, capable of adjustment to suit differing conditions, and sufficiently rugged, that it will withstand severe usage in practice for long periods without failure.

With the above and other objects in view, the nature of which will more fully appear as the description proceeds, the invention consists in the novel construction, combination and arrangement of parts as are herein fully described, illustrated and claimed.

In the accompanying drawings, in which I have shown an embodiment of my invention:—

Figure 1, is a view partly in elevation and partly in vertical section showing so much of the brake operating linkage as is necessary for an understanding of the operation of a brake lever, the lever being illustrated in unoperated position.

Figure 2 is a side elevational view similar to that of Figure 1, but showing the brake pedal in an actuated position and with a portion of the brake pedal, bracket, and bearing as broken away.

Figure 3 is a plan view of the brake pedal bracket, with a portion of the brake pedal and control rod shown as broken away.

Figure 4 is a section on the line 4—4 of Figure 1.

Figure 5 is a detail view in perspective of the brake pull rod lever.

Figure 6 is a side elevation of the brake and operating linkage.

The chassis frame members 10 support the transmission case 11 in accordance with the accepted practice, and in the embodiment illustrated, the brake pedal 12 is carried by a bracket 13, bolted to the transmission case 11. The brake pedal 12 is formed with a bifurcated end $12^a$, pivoted on a rocker shaft 14 which is carried by the bracket 13. Upon the shaft 14 and intermediate the arms of the bifurcated portion of the brake pedal a tripper plate 15 is pivotally mounted.

The lower portion of the plate 15 is provided with ears or bosses $15^a$ which retain adjusting screws 17 adapted to abut the base of the bracket 13 for securing the plate 15 in any position within the limits of adjustment. The upper portion of the plate 15 is formed with an arcuated segment or shoe $15^b$, which provides a fulcrum for a brake pull rod lever 16. This lever is pivoted between the furcations or arms $12^a$ of the brake pedal 12 at a point 18, which is disposed in radial alinement with fulcrum 14 of the brake pedal, to permit the free end of the lever 16 to be rocked about the shoe $15^b$ during the operating of the brake.

The upper end of the brake lever 16 is connected with the brake pull rod 19 through the agency of a link 20 pivotally connected to the lever at 21, and joined to the brake pull rod by a threaded connection 22 at the opposite end of the link 20. The forward end of this link is curved downwardly at $20^a$ to provide a clearance between the link 20 and the lever 16 when the latter is actuated and juxtaposed with the link 20 as illustrated in Figure 2. Tension springs 30, conjoining the brake pull rod 19 maintain the brakes and brake control mechanism in the inactive position illustrated in Figure 1, and an adjustable stop 24 supported in a fixed bracket 23 is provided to limit the movement of the pedal about its pivot 14.

In operation, when the brake pedal 12 is forced forward incident to the application of the brakes, the lever 16 will have its movement with the pedal interrupted by its contact with the stationary tripper plate 15, causing the lever to fulcrum about the shoe $15^b$, and be rotated about its pivot 18; this accelerates the initial movement of the brake pull rod and effects a rapid take-up of clearances in the brakes and correlative linkage. The leverage during the early travel of the pedal 12 is less than that exercised after slack in the linkage and the clearance of the brakes is taken up. Under inactive conditions of the pedal 12 when the lever 16 is in the vertical position as illustrated in Figure 1, the radius between the pivotal connection 21 and the brake pedal fulcrum 14 is of greater length than the radius between the same points after the revolution of the lever 16 about the tripper plate shoe 15$^b$.

It will be understood that the scope of the invention is by no means essentially limited to the specific embodiment shown and described herein as the preceding description illustrates a single practicable embodiment of the invention and as will appear to those skilled in the art, the invention is susceptible of embodiment in various forms differing from that disclosed but which are nevertheless included in the proper scope of the invention.

Having thus described my invention, what I claim as new and desire to secure by Letters Patent is:

1. The combination with a brake, a pedal device therefor, a lever pivoted intermediate its ends and carried by said pedal, connections at one end of the lever to the braking mechanism, a tripper plate having a contact face adapted to engage the free end of said lever, and adjustable means for rocking said tripper plate to vary the position of said contact face relative to the lever free end, and locking means for said adjustable means.

2. The combination with a vehicle brake, of an operating pedal therefor, a lever member pivotally carried by said pedal, a tripper plate member, said members having engaging camming contact faces, said lever member adapted to rock with its said face in engagement with the face of the tripper plate member when said pedal is operated, and mechanism to adjust the position of one of said members to vary the relative position of the member faces and connections from said lever member adapted to communicate the rocking movement thereof to the braking mechanism.

In testimony whereof I hereunto affix my signature.

FERDINAND E. FICK.